US012668432B2

(12) United States Patent
Mizutani et al.

(10) Patent No.: US 12,668,432 B2
(45) Date of Patent: Jun. 30, 2026

(54) CARRIAGE

(71) Applicant: THK CO., LTD., Tokyo (JP)

(72) Inventors: Yuichi Mizutani, Tokyo (JP);
Kazutoshi Harima, Tokyo (JP);
Minami Tsuiki, Tokyo (JP)

(73) Assignee: THK CO., LTD., Tokyo (JP)

( * ) Notice: Subject to any disclaimer, the term of this
patent is extended or adjusted under 35
U.S.C. 154(b) by 62 days.

(21) Appl. No.: 18/835,495

(22) PCT Filed: Feb. 3, 2023

(86) PCT No.: PCT/JP2023/003583
§ 371 (c)(1),
(2) Date: Aug. 2, 2024

(87) PCT Pub. No.: WO2023/149550
PCT Pub. Date: Aug. 10, 2023

(65) Prior Publication Data
US 2025/0145381 A1 May 8, 2025

(30) Foreign Application Priority Data

Feb. 3, 2022 (JP) ................................. 2022-015605

(51) Int. Cl.
*B65G 35/06* (2006.01)
*B61B 13/04* (2006.01)

(52) U.S. Cl.
CPC .............. *B65G 35/06* (2013.01); *B61B 13/04*
(2013.01)

(58) Field of Classification Search
None
See application file for complete search history.

(56) References Cited

U.S. PATENT DOCUMENTS 11,618,632 B2 * 4/2023 Hogan ................... B65G 54/02
198/619
2015/0274342 A1 * 10/2015 Zuccotti .................... B65B 7/28
53/133.2

(Continued)

FOREIGN PATENT DOCUMENTS

JP S6478967 A * 3/1989
JP 11190200 A * 7/1999

(Continued)

OTHER PUBLICATIONS

International Search Report dated Mar. 28, 2023, issued in counterpart Application No. PCT/JP2023/003583, with English Translation. (4 pages).

(Continued)

*Primary Examiner* — Gene O Crawford
*Assistant Examiner* — Muhammad Awais
(74) *Attorney, Agent, or Firm* — WHDA, LLP

(57) ABSTRACT

A carriage moves along rail parts having straight portions and curved portions. The carriage has a pedestal section, and in the pedestal section, at least two first rotor parts and one or a pair of second rotor parts, which are located between the rail parts and which include a pair of wheels that rotate while in contact with side surfaces of the rail parts. The pair of wheels are attached to the pedestal section via support members. Support members of the first rotor parts are located in the pedestal section on predetermined reference lines that overlap center lines of the straight portions of the rail parts when the carriage is moving along the straight portions, and are rotatably connected to the pedestal section such that the rotational centers are positions off a line connecting the rotational centers of the pair of wheels.

4 Claims, 17 Drawing Sheets

(56)　　　　　　　References Cited

U.S. PATENT DOCUMENTS

| | | | | |
|---|---|---|---|---|
| 2019/0218038 A1 * | 7/2019 | Monti | .................. | B65G 35/063 |
| 2019/0389675 A1 * | 12/2019 | Kleinikkink | ....... | H02K 11/0141 |
| 2021/0101763 A1 * | 4/2021 | Tordini | ................ | B65H 29/241 |
| 2021/0276600 A1 * | 9/2021 | Lim | ........................ | B61B 13/02 |

FOREIGN PATENT DOCUMENTS

| | | | | | | |
|---|---|---|---|---|---|---|
| JP | 11208859 | A | * | 8/1999 | | |
| JP | 2001171512 | A | * | 6/2001 | | |
| JP | 2019-531238 | A | | 10/2019 | | |
| WO | WO-2019091546 | A1 | * | 5/2019 | ............. | B61B 13/04 |

OTHER PUBLICATIONS

Extended (supplementary) European Search Report dated Nov. 18, 2025, issued in counterpart EP Application No. 23749866.2. (10 pages).

\* cited by examiner

CARRIAGE

TECHNICAL FIELD

The present invention relates to a carriage.

BACKGROUND ART

Patent Literature 1 discloses a conveyor system having a guide rail and carriers adapted to be guided and moved along the guide rail. The guiderail used in the conveyor system disclosed in Patent Literature 1 includes roller guides on which rollers guided on the side of the track roll in such a way as to be restricted in their movement in the width direction. The carrier used in this conveyor system is provided with a travel supporter having a bogie structure including at least one pair of guide rollers (or right and left rollers) that is arranged to abut on the roller guides provided on both sides of the guide rail in such a way as to hold the roller guides between. The carrier in this conveyor system is driven by a drive force applied by an external device to move along the guide rail. The drive force is applied to the end of arms projecting from the sides of the carrier.

CITATION LIST

Patent Literature

Patent Literature 1: Japanese Patent Laid-Open No. H11-208859.

SUMMARY OF INVENTION

Technical Problem

Let us consider a carriage that moves along a rail part having a straight section(s) and a curved section(s). The carriage has a base unit and a rotor unit. The rotor unit includes a pair of wheels that is rotatably arranged on the base unit in such a way as to sandwich the rail part therebetween. The wheels abut and roll on the sides of the rail part. In this arrangement, it is assumed that the rotor unit is connected to the base unit in such a way as to be rotatable about a center of rotation (also referred to as "the center of rotation of the rotor unit" hereinafter) located at the middle point of the line segment connecting the centers of rotation of the wheels.

To increase the load capacity of the carriage, it is sometimes desired to increase the number of rotor units attached to the base unit to three or more. In the following, a structure including three rotor units attached to the carriage is considered. In this case, the rotor units are arranged in such a way that two rotor units (also referred to as the outer rotor units hereinafter) sandwich one rotor unit (also referred to as the inner rotor unit hereinafter) along the rail part. Assuming a case where the carriage moves along a straight section, it is necessary that the carriage be designed in such a way that the centers of rotation of the three rotor units are located on a predetermined reference line that overlaps the center line of the straight section of the rail part.

On the other hand, when the carriage moves along a curved section of the rail part, the center line of the curved section of the rail part does not overlap the predetermined reference line. For this reason, when the centers of rotation of the two outer rotor units (or the center of rotation of the inner rotor unit) among the three rotor units are (is) located on the predetermined reference line, it is necessary that the carriage be designed in such a way that the rotation center of the inner rotor unit (or the rotation centers of the two outer rotor units) is (are) located at a location(s) offset from the predetermined reference line according to the shape of the curved section.

Next, a structure including four rotor units attached to the carriage is considered. In this case, two rotor units (also referred to as the outer rotor unit hereinafter) are arranged at outer locations with respect to the direction along the rail part, and the other two rotor units (also referred to as the inner rotor units hereinafter) are arranged between the two outer rotor units. Let us consider a case where the carriage moves along a straight section of the rail part. Then, it is necessary that the carriage be designed in such a way that the centers of rotation of the four rotor units are located on a predetermined reference line that overlaps the center line of the straight section of the rail part.

Next, let us consider a case where this carriage moves along a curved section of the rail part. In this case, neither the line segment connecting the centers of rotation of the two outer rotor units nor the line segment connecting the centers of rotation of the two inner rotor units overlaps the center line of the curved section of the rail part. Here, the offset distance of the outer rotor units is defined as the largest distance between the line segment connecting the centers of rotation of the two outer rotor units and the center line of the rail part along the radial direction of the curved section of the rail part. The offset distance of the inner rotor units is defined as the largest distance between the line segment connecting the centers of rotation of the two inner rotor units and the center line of the rail part along the radial direction of the curved section of the rail part. Since the two outer rotor units are arranged outside the two inner rotor units, the offset distance of the two outer rotor units is larger than the offset distance of the two inner rotor units.

As above, when the carriage moves along the curved section of the rail part, the line segment connecting the centers of rotation of the two outer rotor units and the line segment connecting the centers of rotation of the two inner rotor units do not overlap. Therefore, for example, when the centers of rotation of the outer rotor units are located on a predetermined reference line, it is necessary that the carriage be designed in such a way that the centers of rotation of the inner rotor units are located at locations offset from the predetermined reference line. Alternatively, when the centers of rotation of the inner rotor units are located on the predetermined reference line, it is necessary that the carriage be designed in such a way that the centers of rotation of the outer rotor units are located at locations offset from the predetermined reference line.

As above, in the case where the carriage has three or more rotor units, in order to allow the carriage to move along a straight section, it is necessary that the carriage be designed in such a way that the centers of rotation of the three or more rotor units are located on a predetermined reference line. However, in order to allow the carriage to move along a curved section, it is necessary that the carriage be designed in such a way that the center(s) of rotation of either the inner rotor unit(s) or the outer rotor units is/are located at a location(s) offset from the predetermined reference line.

As described above, when the rail part has a straight section(s) and a curved section(s), designing a carriage having three or more rotor units involves a problem in the arrangement of the rotor units. For this reason, it is difficult to increase the number of rotor units to increase the load capacity of the carriage. The present invention has been made to address the above problem, and an object of the present invention is to provide a carriage having a high load capacity.

Solution to Problem

A carriage disclosed herein is a carriage moving along a rail part having a straight section and a curved section, comprising:

a base unit;

at least two first rotor units each including a pair of first wheels rotatably provided on the base unit in such a way as to sandwich the rail part therebetween, each of the first wheels abutting and rolling on a side surface of the rail part; and one or a pair of second rotor units each including a pair of second wheels rotatably provided on the base unit in such a way as to sandwich the rail part therebetween, each of the second wheels abutting and rolling on a side surface of the rail part;

wherein the pair of second wheels in each of the second rotor units is attached to the base unit via a second support member, and the pair of first wheels in each of the first rotor units is attached to the base unit via a first support member, the first support member being connected to the base unit in such a way as to be rotatable about a center of rotation located on a predetermined reference line of the base unit and offset from the line segment connecting the centers of rotation of the pair of first wheels, the predetermined reference line being a line that overlaps the center line of the straight section of the rail part when the carriage is moving along the straight section.

Advantageous Effects of the Invention

According to the present invention, it is possible to provide a carriage having a high load capacity.

DESCRIPTION OF EMBODIMENTS

Figure 1:
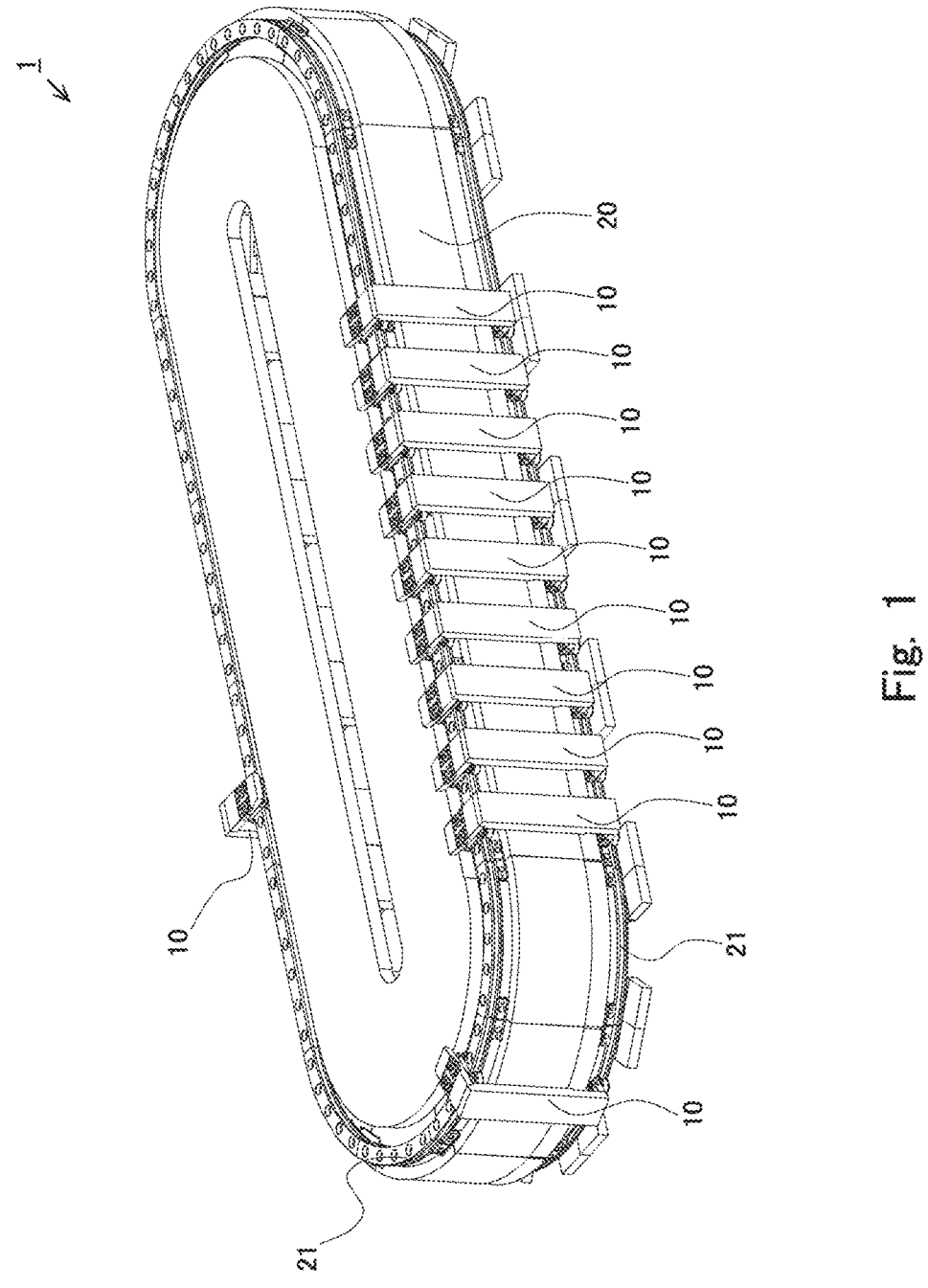
FIG. 1 is a diagram illustrating the general configuration of a conveyor system.

A carriage disclosed herein has at least two first rotor units and one or a pair of second rotor units. The first rotor unit includes a pair of first wheels rotatably provided on a base unit in such a way as to sandwich a rail part therebetween, each of which abuts and rolls on a side surface of the rail part. The second rotor unit includes a pair of second wheels rotatably provided on the base unit in such a way as to sandwich the rail part therebetween, each of which abuts and rolls on a side surface of the rail part.

The pair of second wheels in the second rotor unit is attached to the base unit via a second support member. The second rotor unit is disposed in such a way that the pair of second wheels can abut on the side surfaces of the rail part in such a way as to sandwich the rail part therebetween in both straight and curved sections of the rail part. The second support member of the second rotor unit may be fixedly attached to the base unit. Alternatively, the second rotor unit may be rotatably connected to the base unit via the second support member at the middle point of the line segment connecting the centers of rotation of the pair of second wheels.

The pair of first wheels in the first rotor unit is attached to the base unit via a first support member. The first support member is connected to the base unit in such a way as to be rotatable about a center of rotation (also referred to as the "first center of rotation" hereinafter) that is located on a predetermined reference line in the base unit and offset from the line segment connecting the centers of rotation of the pair of first wheels. The predetermined reference line is a straight line defined in relation to the base unit that overlaps the center line of the straight section of the rail part when the carriage is moving along the straight section of the rail part.

As the carriage is designed as above, when the carriage is moving along the straight section, the first centers of rotation of the first rotor units are located on the center line of the straight section of the rail part. In consequence, when the carriage moves along the straight section of the rail part, the middle point of the line segment connecting the centers of rotation of the pair of first wheels in each first rotor unit can be located on the center line of the rail part. This allows the pair of first wheels in each first rotor unit to maintain the state of abutting on the side surfaces of the rail part in such a way as to sandwich the rail part therebetween. As described above, the first support member is connected to the base unit in such a way as to be rotatable about the first center of rotation. The first center of rotation is disposed at a position located on the predetermined reference line and offset from the line segment connecting the centers of rotation of the pair of first wheels. With this arrangement, when the carriage moves along the curved section of the rail part also, the middle point of the line segment connecting the centers of rotation of the pair of first wheels in the first rotor unit can be located on the center line of the rail part by the rotation of the first rotor unit about the first center of rotation in a manner similar to that when the carriage moves along the straight section of the rail part. Therefore, when the carriage moves along the curved section also, the pair of first wheels in each first rotor unit can maintain the state of abutting on the side surfaces of the rail part in such a way as to sandwich the rail part therebetween. In this way, according to the present disclosure, it is possible to produce a carriage having three or more rotor units even in the case where the rail part has a straight section and a curved section.

As described above, the carriage according to the present disclosure can be designed to have three or more rotor units. Therefore, it is possible to increase the load capacity of the carriage disclosed herein by increasing the number of rotor units. In this way, it is possible to provide a carriage having a high load capacity.

In the following, specific embodiments of the present invention will be described with reference to the drawings. The dimensions, materials, shapes, relative arrangements and other features that will be described in the description of the embodiments are not intended to limit the technical scope of the present invention only to them unless stated otherwise.

First Embodiment

A conveyor system 1 according to an embodiment will be described with reference to FIGS. 1 to 10. FIG. 1 is a diagram illustrating the general configuration of the conveyor system 1. The conveyor system 1 includes a plurality of carriages 10 and a rail base part 20. To the rail base part 20 are attached rail parts 21. The rail part 21 includes straight sections and curved sections. The curvature of the curved section is constant. Each carriage 10 moves along the rail parts 21.

Figure 2:
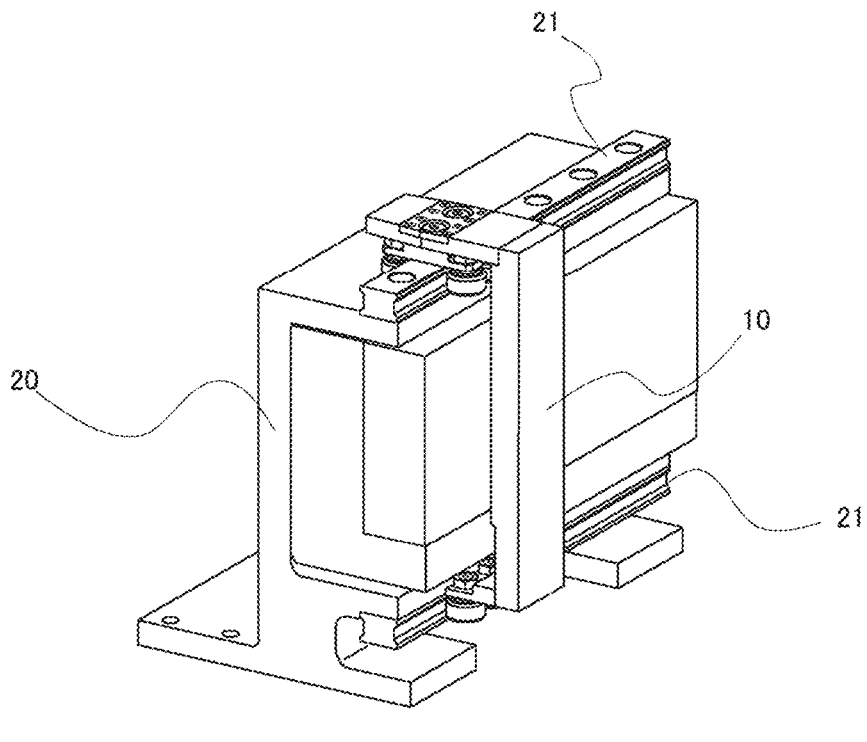
FIG. 2 is a diagram illustrating an example of the arrangement of a carriage and a rail base part.

FIG. 2 is a diagram illustrating an example of the arrangement of a carriage 10 and the rail base part 20. As illustrated in FIG. 2, two rail parts 21 are attached to the upper and lower portions of the rail base part 20. The carriage 10 is set in such a way as to be movable along the two rail parts 21. The rail base part 20 is a base on which various components including the rail parts 21 are attached.

Figure 3:
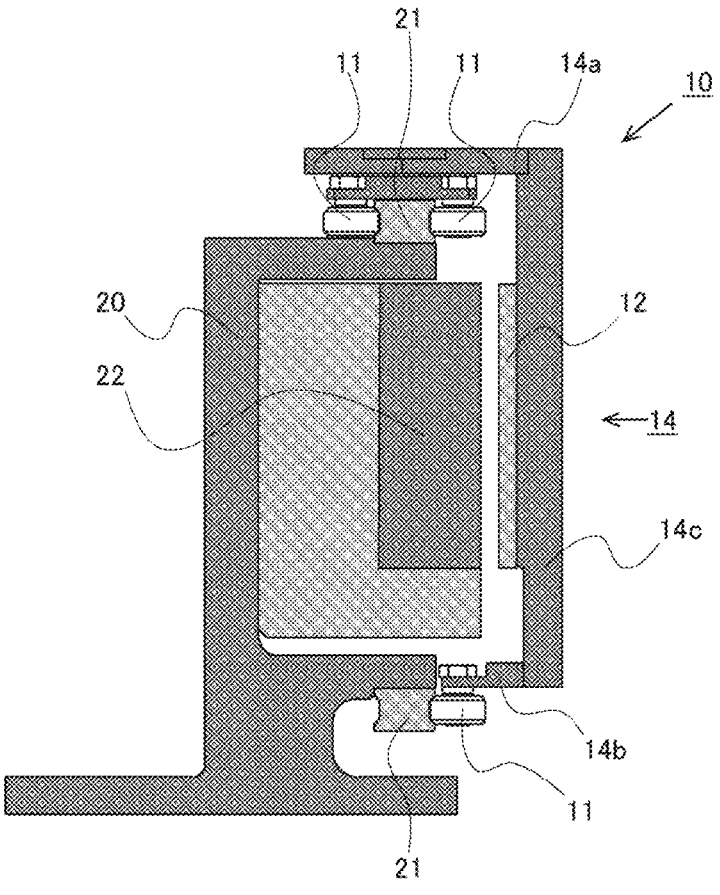
FIG. 3 is a diagram schematically illustrating a structure of the rail base part and the carriage.

FIG. 3 is a diagram illustrating the general configuration of the rail base part 20 and the carriage 10. As illustrated in FIG. 3, the carriage 10 has a plurality of wheels 11, a motor magnet 12, and a base unit 14. As illustrated in FIG. 3, the two rail parts 21 and a motor coil 22 are attached to the rail base part 20.

The base unit 14 is the base of the carriage 10 to which various components are attached. As illustrated in FIG. 3, the cross section of the base unit 14 has a U-shape. The carriage 10 is disposed in such a way, in relation to the rail base part 20, that the upper part 14a and the lower part 14b of the base unit 14 are opposed to the rail parts 21 attached to the upper and lower portions of the rail base part 20. The upper part 14a and the lower part 14b of the base unit 14 are each provided with a plurality of wheels 11. The wheels 11 attached to the upper part 14a of the base unit 14 are arranged in such a way that the paired wheels 11 sandwich the rail part 21 opposed to them. In this way, the carriage 10 is guided by the rail part 21 provided on the upper portion of the rail base unit 20. How the wheels are arranged in the upper part 14a of the base unit 14 will be described in detail later. The wheels 11 attached to the lower part 14b of the base unit 14 are arranged in such a way as to abut on one side surface of the rail part 21 opposed to them (i.e. the outer side surface of the rail part 21). Thus, the carriage 10 is supported by the rail part 21 provided on the lower portion of the rail base unit 20.

The rail base part 20 is provided with a motor coil 22. The motor coil 22 is a coil that generates a magnetic field when electric current is applied to it. The motor magnet 12 is provided on the side part 14c of the base unit 14, which is connected with the upper part 14a and the lower part 14b. The motor magnet 12 is arranged at a position opposed to the motor coil 22 of the rail base part 20. The motor magnet 12 has N poles and S poles that are arranged alternately. The magnetic field generated by the motor magnet 12 and the magnetic field generated by the motor coil 22 can move the carriage 10 along the rail part 21.

Figure 4:
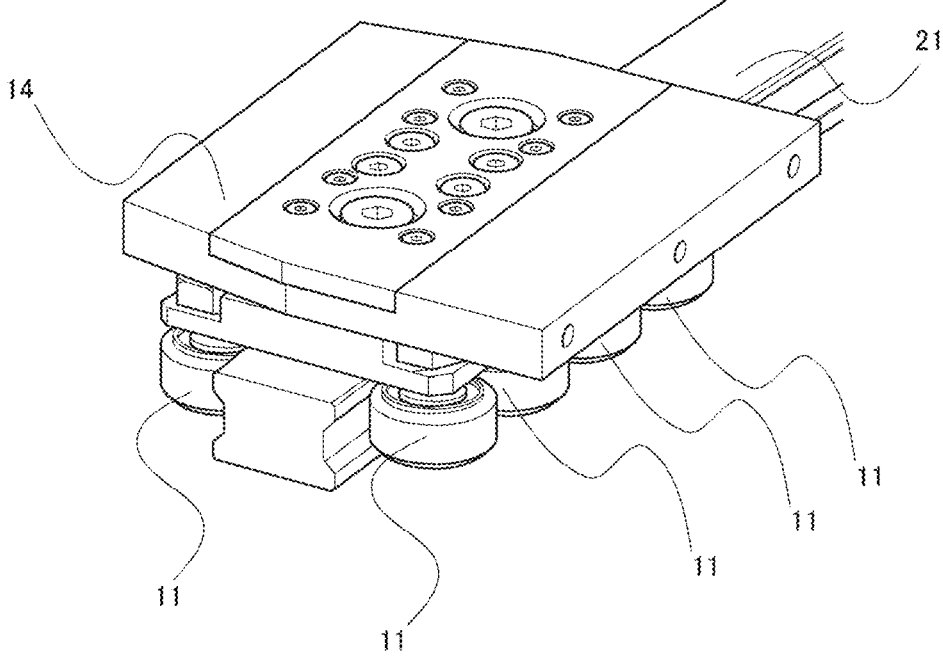
FIG. 4 is a diagram illustrating an arrangement of a carriage and a rail part according to a first embodiment.

FIG. 4 is a diagram illustrating the arrangement of the carriage 10 and the rail part 21 according to the embodiment. Specifically, FIG. 4 illustrates how the upper part 14a of the base unit 14 of the carriage 10 and the rail part 21 are arranged. The upper part 14a of the base unit 14 of the carriage 10 is provided with eight wheels 11.

Figure 5:
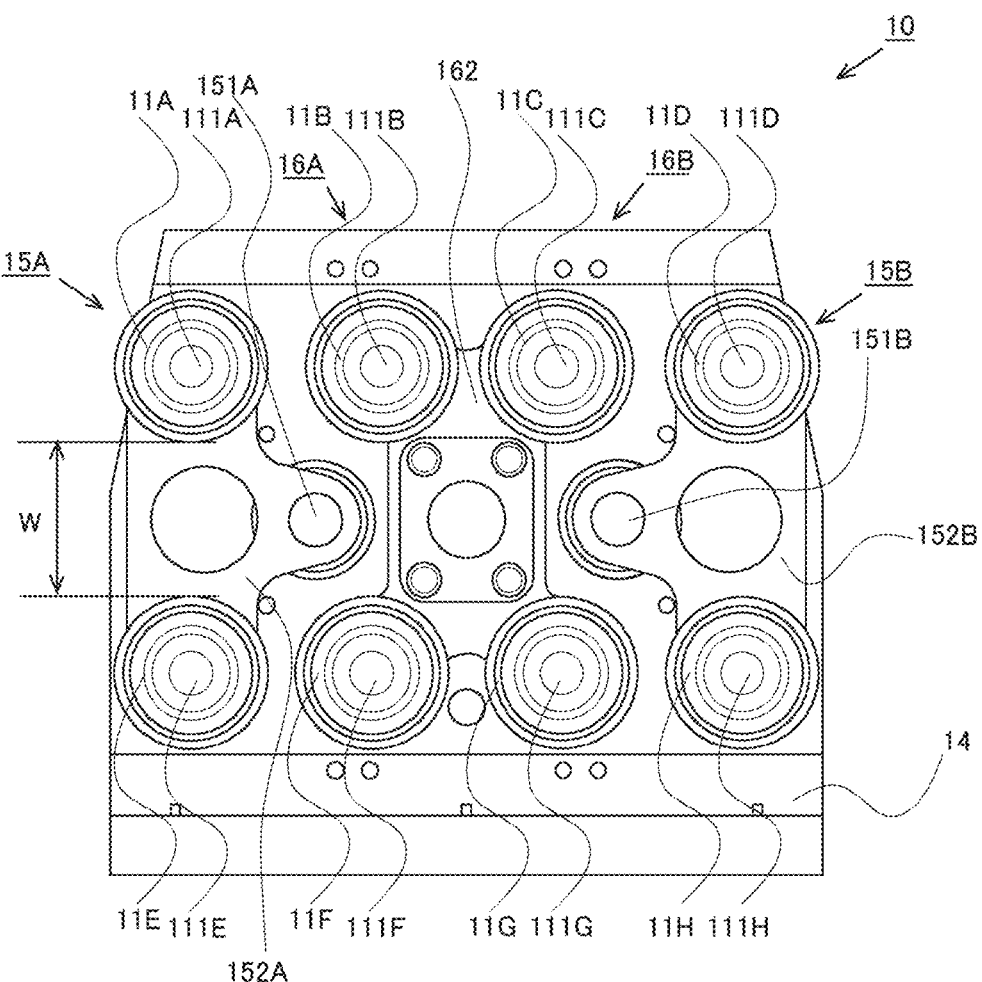
FIG. 5 is a diagram illustrating an arrangement of rotor units in the upper part of a base unit of the carriage.

As described above, the wheels 11 attached to the upper part 14a of the base unit 14 of the carriage 10 are arranged in such a way that the rail part 21 is sandwiched by the paired wheels 11. The structure including a pair of wheels 11 that sandwich the rail part 21 will be referred to as a rotor unit. FIG. 5 is a diagram illustrating the arrangement of the rotor units on the upper part 14a of the base unit 14 of the carriage 10 according to the embodiment. As illustrated in FIG. 5, four rotor units 15A, 15B, 16A, 16B each including a pair of wheels 11 are attached to the upper part 14a of the base unit 14. Among the four rotor units 15A, 15B, 16A, and 16B, the two rotor units 15A, 15B that are arranged at outer positions on the base unit 14 will be referred to as the "first rotor units". When it is not necessary to discriminate between the two first rotor units 15A and 15B, they will be collectively referred to as the first rotor unit(s) 15. Among the four rotor units 15A, 15B, 16A, and 16B, the two rotor units 16A and 16B arranged at inner positions on the base unit 14 will be referred to as the "second rotor units". When it is not necessary to discriminate between the two second rotor units 16A and 16B, they will be collectively referred to as the second rotor unit(s) 16.

The first rotor unit 15A includes wheels 11A and 11E, wheel rotary shaft members 111A and 111E, a first rotary shaft member 151A, and a first support member 152A. The first rotor unit 15B includes wheels 11D and 11H, wheel rotary shaft members 111D and 111H, a first rotary shaft member 151B, and a first support member 152B. The wheel 11A and the wheel 11E in the first rotor unit 15A are respectively attached to the first support member 152A via the wheel rotary shaft member 111A and the wheel rotary shaft member 111E. The wheel 11D and the wheel 11H in the first rotor unit 15B are respectively attached to the first support member 152B via the wheel rotary shaft member 111D and the wheel rotary shaft member 111H.

The pair of wheels 11A and 11E in the first rotor unit 15A and the pair of wheels 11D and 11H in the first rotor unit 15B are arranged in such a way that the distance between the paired wheels 11 is equal to the width W of the rail part 21. The first support member 152 in each of the first rotors 15 is rotatably connected to the base unit 14 by the first rotary shaft member 151.

The second rotor unit 16A includes wheels 11B and 11F and wheel rotary shaft members 111B and 111F. The second rotor unit 16B includes wheels 11C and 11G and wheel rotary shaft members 111C and 111G. The second rotor unit 16A and the second rotor unit 16B share a second support member 162. The wheel 11B and the wheel 11F in the second rotor unit 16A are respectively attached to the second support member 162 via the wheel rotary shaft member 111B and the wheel rotary shaft member 111F. The wheel 11C and the wheel 11G in the second rotor unit 16B are respectively attached to the second support member 162 via the wheel rotary shaft member 111C and the wheel rotary shaft member 111G. The second support member 162 is fixedly attached to the base unit 14.

Figure 6:
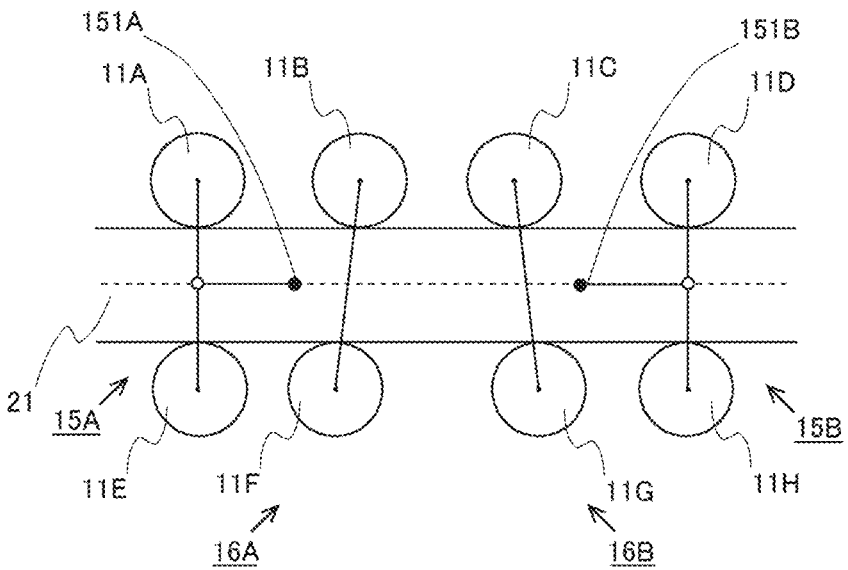
FIG. 6 is a diagram illustrating a state of two first rotor units and two second rotor units while the carriage is moving along a straight section of the rail part.

FIG. 6 is a diagram schematically illustrating a state of the two first rotor units 15 and the two second rotor units 16 while the carriage 10 is moving along a straight section of the rail part 21. As illustrated in FIG. 6, the center of rotation of the first rotary shaft member 151A in the first rotor unit 15A is located on a predetermined reference line (indicated by the broken line in FIG. 6) that overlaps the center line of the rail part 21 while the carriage 10 is moving along the straight section of the rail part 21. The center of rotation of the first rotary shaft member 151A in the first rotor unit 15A is located at a position offset from the line segment connecting the center of rotation of the wheel 11A and the center of rotation of the wheel 11E. Therefore, while the carriage 10 is moving along the straight section, the middle point of the line segment connecting the center of rotation of the wheel 11A and the center of rotation of the wheel 11E can be located on the center line of the straight section of the rail part 21.

The center of rotation of the first rotary shaft member 151B in the first rotor unit 15B is also located on the predetermined reference line that overlaps the center line of the rail part 21 while the carriage 10 is moving along the straight section of the rail part 21. The center of rotation of the first rotary shaft member 151B in the first rotor unit 15B is also located at a position offset from the line segment connecting the center of rotation of the wheel 11D and the center of rotation of the wheel 11H while the carriage 10 is moving along the straight section of the rail part 21. Therefore, while the carriage 10 is moving along the straight section, the middle point of the line segment connecting the center of rotation of the wheel 11D and the center of rotation of the wheel 11H can be located on the center line of the straight section of the rail part 21.

Figure 7:
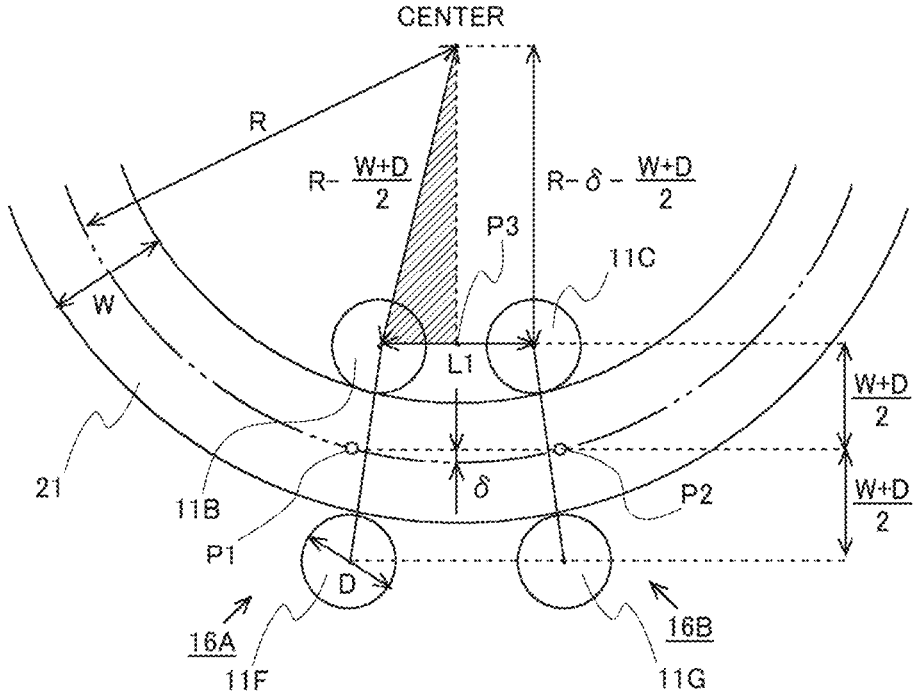
FIG. 7 is a first diagram illustrating an arrangement of wheels in the second rotor units.
Figure 8:
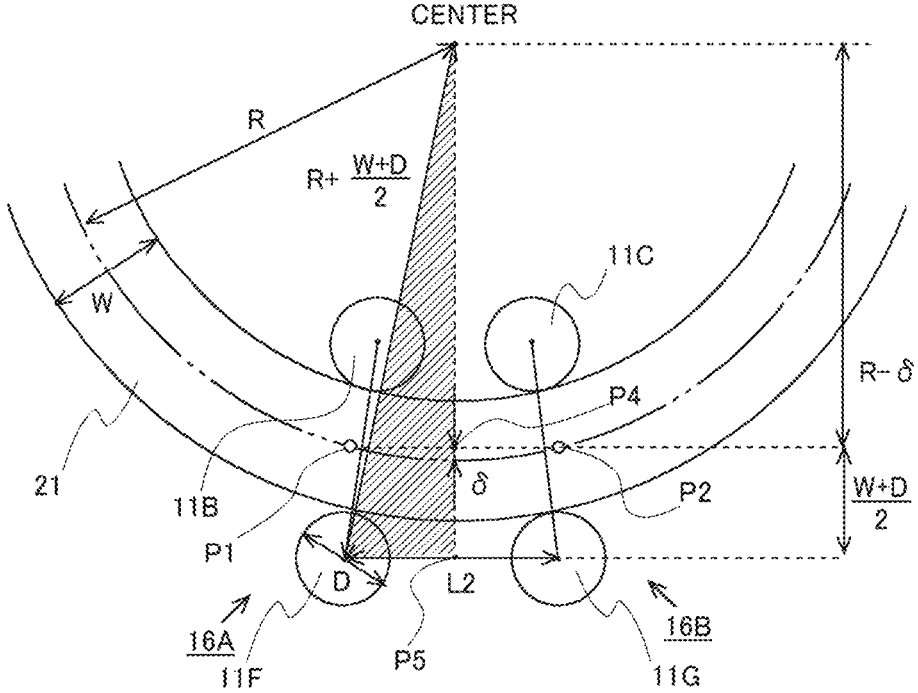
FIG. 8 is a first diagram illustrating an arrangement of the wheels in the second rotor units.
Figure 9:
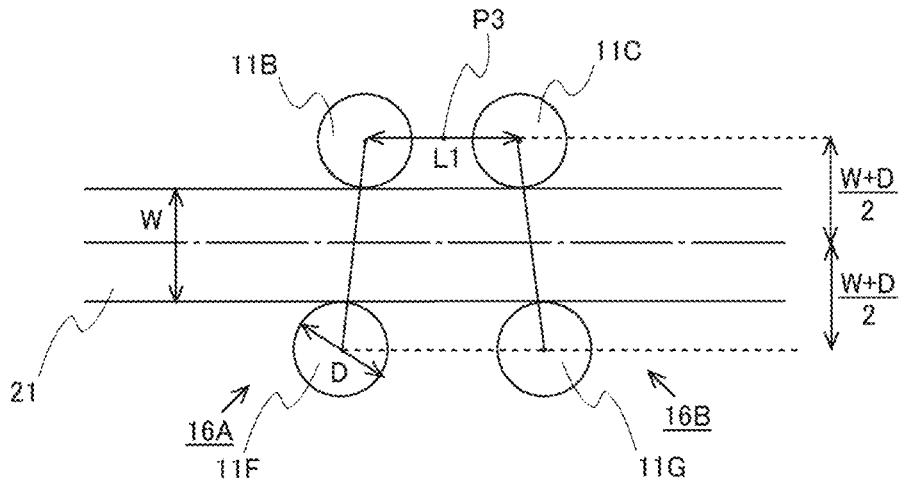
FIG. 9 is a diagram illustrating a state of the second rotor units while the carriage is moving along the straight section of the rail part.

Next, the arrangement of the wheels 11 in the second rotor units 16 shown in FIG. 5 will be descried with reference to FIGS. 7 through 9. FIG. 7 is a first diagram illustrating an arrangement of the wheels 11 in the second rotor units 16. In FIG. 7, W is the width of the rail part 21, D is the diameter of the wheel 11, and R is the radius of the curved section of the center line of the rail part 21.

We discuss a state in which the carriage is moving along a curved section of the rail part 21. In this state, the predetermined reference line does not overlap the center line of the curved section of the rail part 21. Here, the points of intersection of the predetermined reference line and the center line of the curved section of the rail part 21 are referred to as points P1 and P2. The largest distance between the line segment connecting the points P1 and P2 and the center line of the curved section of the rail part 21 is expressed as d. This distance will also be referred to as the offset distance of the second rotor unit 16 hereinafter.

The four wheels 11 are disposed in such a way that the distance between the line segment connecting points P1 and P2 and the line segment connecting the center of rotation of the wheel 11B and the center of rotation of the wheel 11C is equal to (W+D)/2 and that the distance between the line segment connecting points P1 and P2 and the line segment connecting the center of rotation of the wheel 11F and the center of rotation of the wheel 11G is equal to (W+D)/2. Therefore, the four wheels 11 are disposed in such a way that the distance between the line segment connecting the center of rotation of the wheel 11B and the center of rotation of the wheel 11C and the line segment connecting the center of rotation of the wheel 11F and the center of rotation of the wheel 11G is equal to W+D.

Then, the distance from the center of curvature of the curved section of the rail part 21 to the center of rotation of the wheel 11B is equal to R−(W+D)/2. The distance from the center of curvature of the curved section of the rail part 21 to the line segment connecting the center of rotation of the wheel 11B and point P3 is equal to R−δ−(W+D)/2, where point P3 is the middle point of the line segment connecting the center of rotation of the wheel 11B and the center of rotation of the wheel 11C. Thus, a right-angled triangle (hatched in FIG. 7) is formed by three line segments, the line segment that connects the center of curvature of the curved section of the rail part 21 and the center of rotation of wheel 11B, the line segment that connects the center of rotation of the wheel 11B and point P3, and the line segment that connects point P3 and the center of curvature of the curved section of the rail part 21. Therefore, the distance L1 between the center of rotation of the wheel 11B and the center of rotation of the wheel 11C is expressed by the following equation 1.

$$L1 = 2\sqrt{\left(R - \frac{W+D}{2}\right)^2 - \left(R - \delta - \frac{W+D}{2}\right)^2} \qquad \text{(equation 1)}$$

FIG. 8 is a second diagram illustrating an arrangement of the wheels 11 in the second rotor units 16. In this case, the distance from the center of curvature of the curved section of the rail part 21 to the center of rotation of the wheel 11F is equal to R+(W+D)/2. The distance from the center of curvature of the curved section of the rail part 21 to point P4 is equal to R−δ. Point P4 is the middle point of the line segment connecting points P1 and P2. Then, the distance from the center of curvature of the curved section of the rail part 21 to point P5 is equal to R−δ+(W+D)/2. Point P5 is the meddle point of the line segment connecting the center of rotation of the wheel 11F and the center of rotation of the wheel 11G. Then, a right-angled triangle (hatched in FIG. 8) is formed by three line segments, the line segment that connects the center of curvature of the curved section of the rail part 21 and the center of rotation of the wheel 11F, the line segment that connects the center of rotation of the wheel 11F and point P5, and the line segment that connects point P5 and the center of curvature of the curved section of the rail part 21. Therefore, the distance L2 between the center of rotation of the wheel 11F and the center of rotation of the wheel 11G is expressed by the following equation 2.

$$L2 = 2\sqrt{\left(R + \frac{W+D}{2}\right)^2 - \left(R - \delta + \frac{W+D}{2}\right)^2} \qquad \text{(equation 2)}$$

As the wheels 11B, 11C, 11F, and 11G are arranged in such a way as to satisfy the above equations 1 and 2, the wheels 11B, 11C, 11F, and 11G can abut on the side surfaces of the rail part 21 in such a way that the wheels 11B and 11F and the wheels 11C and 11G respectively sandwich the rail part 21 therebetween in the curved section of the rail part 21.

FIG. 9 is a diagram illustrating a state of the second rotor units 16 while the carriage 10 is moving along a straight section of the rail part 21. The distance between the predetermined reference line and the line segment connecting the center of rotation of the wheel 11B and the center of rotation of the wheel 11C is equal to (W+D)/2. The distance between the predetermined reference line and the line segment connecting the center of rotation of the wheel 11F and the center of rotation of the wheel 11G is equal to (W+D)/2. Then, the distance between the line segment that connects the point of contact between the wheel 11B and the rail part 21 and the point of contact between the wheel 11C and the rail part 21 and the line segment that connects the point of contact between the wheel 11F and the rail part 21 and the point of contact between the wheel 11G and the rail part 21 is equal to W. Therefore, in the straight section of the rail part 21 also, the wheels 11B, 11C, 11F, and 11G can abut on the side surfaces of the rail part 21 in such a way that the wheels 11B and 11F and the wheels 11C and 11G respectively sandwich the rail part 21 therebetween.

Figure 10:
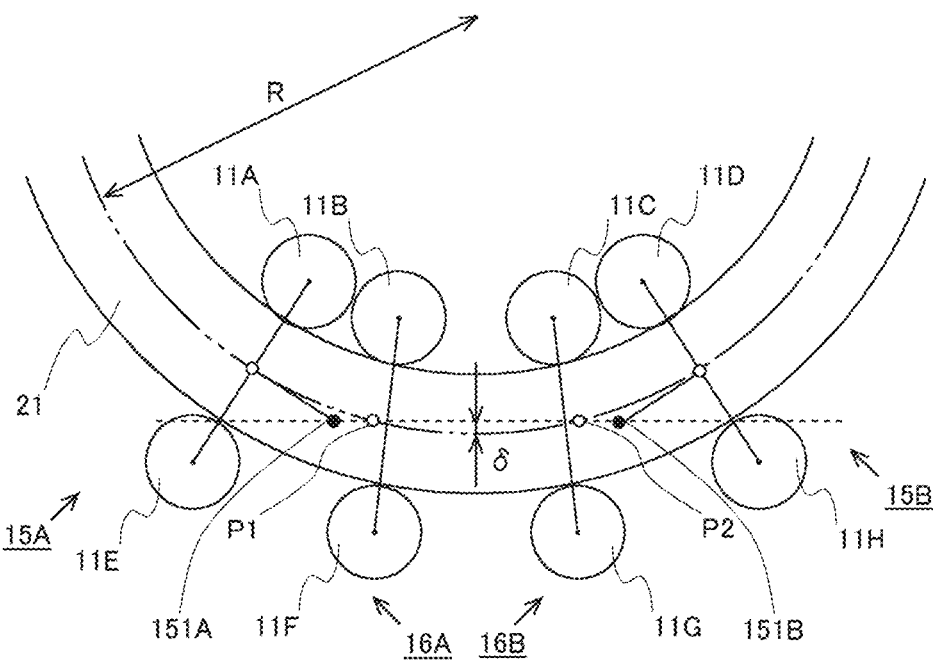
FIG. 10 is a diagram illustrating a state of the two first rotor units and the two second rotor units while the carriage according to the first embodiment is moving along the curved section of the rail part.

Next, the first rotor units 15 shown in FIG. 5 will be described with reference to FIG. 10. FIG. 10 is a diagram illustrating a state of the two first rotor units 15 and the two second rotor units 16 while the carriage 10 according to the embodiment is moving along the curved section of the rail part 21.

In FIG. 10, the first rotary shaft member 151A of the first rotor unit 15A and the first rotary shaft member 151B of the first rotor unit 15B are indicated by black dots. As illustrated in FIG. 10, the center of rotation of the first rotary shaft member 151A of the first rotor unit 15A is disposed in such a way that the center of rotation is located at a position on the predetermined reference line and offset from the line segment connecting the center of rotation of the wheel 11A and the center of rotation of the wheel 11E. The first rotary shaft member 151B of the first rotor unit 15B is disposed in such a way that its center of rotation is located at a position on the predetermined reference line and offset from the line segment connecting the center of rotation of the wheel 11D and the center of rotation of the wheel 11H.

Since the center of rotation of the first rotary shaft member 151A of the first rotor unit 15A is disposed in this way, while the carriage 10 is moving along the curved section of the rail part, the first rotor unit 15A rotates about the first rotary shaft member 151A so that the middle point of the line segment connecting the center of rotation of the wheel 11A and the center of rotation of the wheel 11E can be located on the center line of the rail part 21. Therefore, while the carriage 10 is moving along the curved section of the rail part 21, it is possible to maintain a state in which the wheel 11A and the wheel 11E of the first rotor unit 15A abut on the side surfaces of the rail part 21 in such a way as to sandwich the rail part 21 therebetween. Likewise, in the other first rotor unit 15B also, it is possible to maintain a state in which the wheel 11D and the wheel 11H abut on the side surfaces of the rail part 21 in such a way as to sandwich the rail part 21 therebetween, while the carriage 10 is moving along the curved section of the rail part 21.

Comparative Example

Another carriage 30 having a structure different from the carriage 10 according to the embodiment will be described here with reference to FIGS. 11 and 12 by way of comparison. The carriage 30 of this comparative example is a carriage that has four rotor units in its upper portion. The lower portion of the carriage 30 of this comparative example has one or more wheels 11 that are arranged in such a way as to abut on the side surface of the rail part 21 opposed thereto in a similar manner as with the lower portion 14b of the base unit 14 of the carriage 10. In the following, a case where the carriage 30 is moving along a straight section of the rail part 21 will be discussed.

Figure 11:
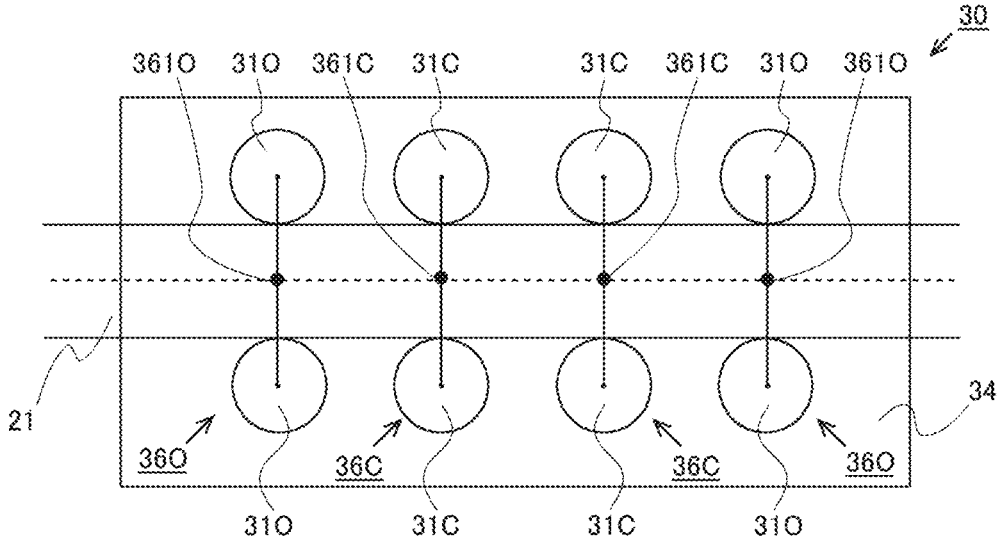
FIG. 11 is a diagram illustrating a disposition of four rotor units that is required to be met when a carriage of a comparative example moves along the straight section of the rail part.

FIG. 11 is a diagram illustrating a disposition of the four rotor units that is required to be met when the carriage 30 of this comparative example is moving along the straight section of the rail part 21. As illustrated in FIG. 11, the carriage 30 has two rotor units 36C and two rotor units 36O, all of which are provided on a base unit 34. The two rotor units 36O are disposed in such a way as to sandwich the other two rotor units 36C. When it is not necessary to discriminate between the rotor units 36C and the rotor units 36O, they will be referred to as the rotor units 36.

Each of the rotor units 36C is provided with a pair of wheels 31C that are rotatable and arranged in such a way as to sandwich the rail part 21 therebetween so that they can abut and roll on the side surfaces of the rail part 21. Each of the rotor units 36O is provided with a pair of wheels 31O that are rotatable and arranged in such a way as to sandwich the rail part 21 therebetween so that they can abut and roll on the side surfaces of the rail part 21. Each of the rotor unit 36C is connected to the base unit 34 in such a way as to be rotatable about the center of rotation of a rotor's rotary shaft member 361C provided at the middle point of the line segment that connects the centers of rotation of the two wheels 31C. Each of the rotor unit 36O is connected to the base unit 34 in such a way as to be rotatable about the center of rotation of a rotor's rotary shaft member 361O provided at the middle point of the line segment that connects the centers of rotation of the two wheels 31O.

Considering cases where the carriage 30 moves along a straight section of the rail part 21, it is necessary that the carriage 30 be designed in such a way that the centers of the rotor's rotary shaft members 361C of the two rotor units 36C and the centers of the rotor's rotary shaft members 361O of the two rotor units 36O be located on a predetermined reference line represented by the broken line in FIG. 11.

Next, we will consider cases where the carriage moves along a curved section of the rail part 21. FIG. 12 is a diagram illustrating a disposition of the four rotor units that is required to be met when the carriage 30 of the comparative example moves along a curved section of the rail part 21.

Figure 12:
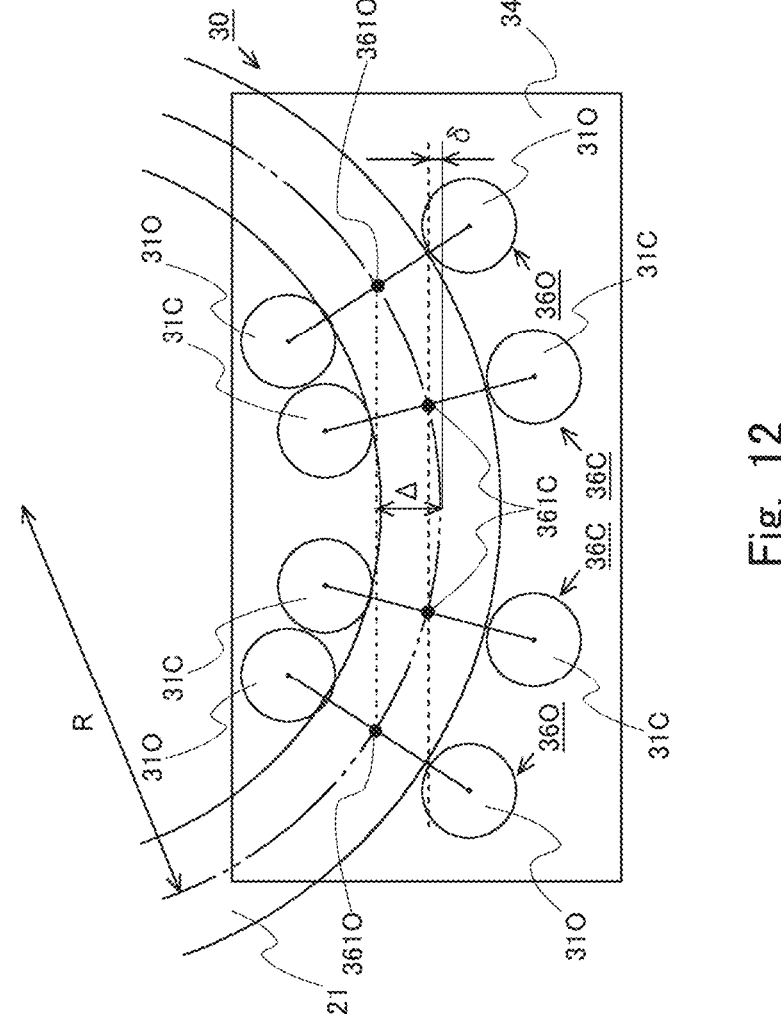
FIG. 12 is a diagram illustrating a disposition of the four rotor units that is required to be met when the carriage of the comparative example moves along the curved section of the rail part.

As illustrated in FIG. 12, in order for the carriage 30 to move along the curved section of the rail part 21, it is necessary that the center of the rotor's rotary shaft member 361C provided at the middle point of the line segment connecting the centers of rotation of the two wheels 31C of each rotor unit 36C be located on the center line of the curved section of the rail part 21. In this case, the center line of the curved section of the rail part 21 and the line segment connecting the centers of the rotor's rotary shaft members 361C of the two rotor units 36C do not overlap. In this state, the largest distance δ between the line segment connecting the centers of the rotor's rotary shaft members 361C of the two rotor units 36C and the center line of the curved section of the rail part 21 along the radial direction of the curved section of the rail part 21 is referred to as the offset distance of the rotor units 36C.

As illustrated in FIG. 12, in order for the carriage 30 to move along the curved section of the rail part 21, it is necessary that the center of the rotor's rotary shaft member 361O provided at the middle point of the line segment connecting the centers of rotation of the two wheels 31O of each rotor unit 36O be located on the center line of the curved section of the rail part 21. In this case, the center line of the curved section of the rail part 21 and the line segment connecting the rotor's rotary shaft members 361O of the two rotor units 36O do not overlap. In this state, the largest distance Δ between the line segment connecting the centers of the rotor's rotary shaft member 361O of the two rotor units 36O and the center line of the curved section of the rail part 21 along the radial direction of the curved section of the rail part 21 is referred to as the offset distance of the rotor units 36O.

Since the two rotor units 36O are arranged on the outer side of the two rotor units 36C, the offset distance Δ of the rotor units 36O is larger than the offset distance δ of the rotor units 36C. Therefore, it is necessary that the line segment connecting the centers of the rotor's rotary shaft members 361C of the two rotor units 36C and the line segment connecting the centers of the rotor's rotary shaft members 361O of the two rotor units 36O be displaced by a distance equal to Δ−δ. Therefore, when the carriage 30 is to move along the curved section of the rail part 21, the line segment connecting the centers of the rotor's rotary shaft members 361C of the two rotor units 36C and the line segment connecting the centers of the rotor's rotary shaft members 361O of the two rotor units 36O do not overlap. Therefore, for example, when the centers of the rotor's rotary shaft members 361C of the rotor units 36C are disposed on the predetermined reference line, it is necessary that the centers of the rotor's rotary shaft members 361O of the rotor units 36O be disposed at positions offset from the predetermined reference line. Likewise, for example, when the centers of the rotor's rotary shaft members 361O of the rotor units 36O are disposed on the predetermined reference line, it is necessary that the centers of the rotor's rotary shaft members 361C of the rotor units 36C be disposed at positions offset from the predetermined reference line.

As above, in order for the carriage 30 to move along a straight section, it is necessary that the carriage 30 be designed in such a way that the four rotor units 36 are disposed on the predetermined reference line. However, in order for the carriage 30 to move along a curved section, it is necessary that the carriage 30 be designed in such a way that the centers of the rotor's rotary shaft members 361C of the rotor units 36C or the centers of the rotor's rotary shaft members 361O of the rotor units 36O are disposed at positions offset from the predetermined reference line. Therefore, when four rotor units each of which is designed to be rotatable about a center of rotation located at the middle point of the line segment connecting the centers of rotation of a pair of wheels are used, it is not possible to design a carriage that can move along a rail part having a straight section and a curved section. In contrast, as described above, the carriage 10 according to the embodiment uses the two second rotor units 16 whose center of rotation 151 is located at a position offset from the line segment connecting the pair of wheels 11.

As described above, the carriage 10 can be designed to have a structure including four rotor units, namely the first rotor unit 15A, the first rotor unit 15B, the second rotor unit 16A, and the second rotor unit 16B. Therefore, it is possible to increase the number of rotor units to four in the upper part 14a of the base unit 14 of the carriage 10 to increase the load capacity of the carriage. In this way, it is possible to provide the carriage 10 having a high load capacity.

First Modification

Figure 13:
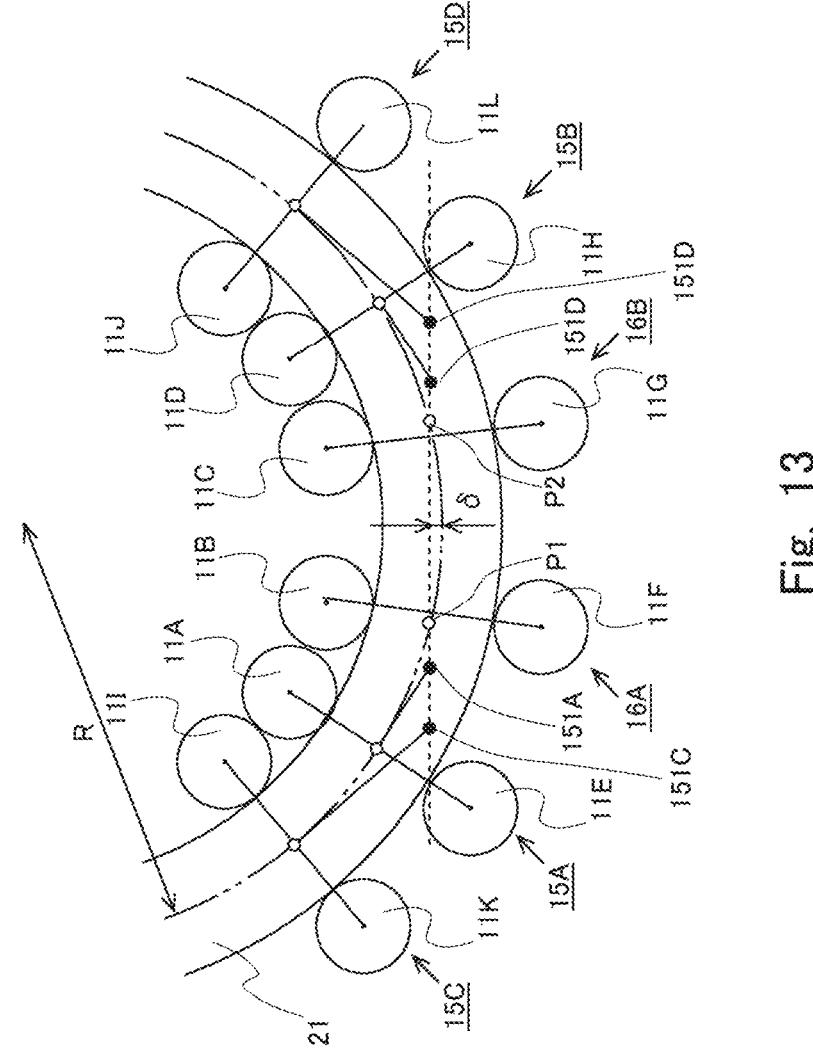
FIG. 13 is a diagram illustrating an arrangement of four first rotor units and two second rotor units according to a modification.

The upper part 14a of the carriage 10 according to the embodiment is provided with two first rotor units 15. The carriage 10 may be provided with more than two first rotor units 15 in its upper part 14a. For example, the carriage 10 may be provided with four first rotor units 15 in its upper part 14a. FIG. 13 is a diagram illustrating an arrangement of four first rotor units 15 and two second rotor units 16 according to a first modification. As illustrated in FIG. 13, there are provided a first rotor unit 15C and a first rotor unit 15D in addition to the first rotor unit 15A, the first rotor unit 15B, the second rotor unit 16A, and the second rotor unit 16B. The first rotor unit 15C and the first rotor unit 15D are disposed in such a way as to sandwich the first rotor unit 15A, the first rotor unit 15B, and the second rotor units 16 between them. The first rotor unit 15C includes wheels 11I and 11K, wheel rotary shafts 111C, and a first rotary shaft member 151C. The first rotor unit 15D includes wheels 11J and 11L, wheel rotary shafts 111D, and a first rotary shaft member 151D.

The center of the first rotary shaft member 151C of the first rotor unit 15C is disposed in such a way that its center of rotation is located at a position on a predetermined reference line and offset from the line segment connecting the center of rotation of the wheel 11I and the center of rotation of the wheel 11K. This arrangement allows the middle point of the line segment connecting the centers of rotation of the wheels 11I and 11K of the first rotor unit 15C to be located on the center line of the rail part 21 in both the curved and straight sections of the rail part 21. Similarly, the center of the first rotary shaft member 151D of the first rotor unit 15D is disposed in such a way that its center of rotation is located at a position on a predetermined reference line and offset from the line segment connecting the center of rotation of the wheel 11J and the center of rotation of the wheel 11L. This arrangement allows the middle point of the line segment connecting the centers of rotation of the wheels 11J and 11L of the first rotor unit 15D to be located on the center line of the rail part 21 in both the curved and straight sections of the rail part 21. In this way, the wheels 11I and 11K of the first rotor unit 15C and the wheels 11J and 11L of the first rotor unit 15D can maintain the state of abutting on the side surfaces of the rail part 21 in such a way as to sandwich the rail part 21 therebetween in both the curved and straight sections of the rail part 21. This arrangement also can provide a carriage having a high load capacity.

The carriage of this modification has four first rotor units 15 attached to the upper part 14a of the base unit 14. However, it is not necessary for the carriage to have four first rotor units 15 that are attached to the base unit 14. For example, the carriage may have three first rotor units 15 (the first rotor unit 15A, the first rotor unit 15B, and the first rotor unit 15C) that are attached to the upper part 14a of the base unit 14. This arrangement can also provide a carriage having a high load capacity.

Second Modification

Figure 14:
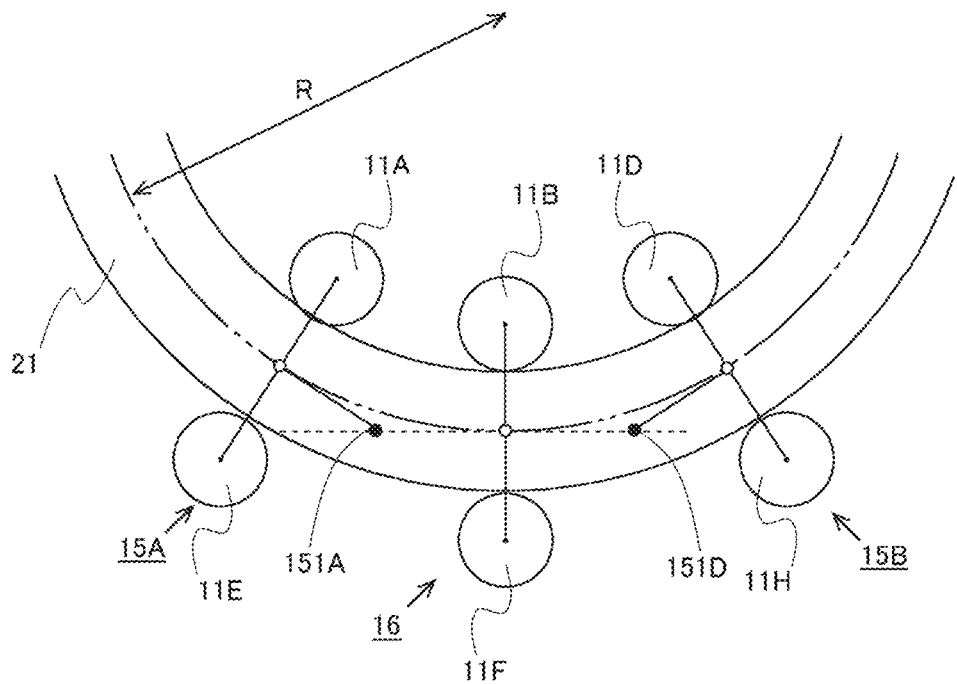
FIG. 14 is a diagram illustrating an arrangement of two first rotor units and one second rotor unit according to a modification.

The upper part 14a of the base unit 14 according to the embodiment is provided with two second rotor units 16 (the second rotor unit 16A and the second rotor unit 16B). However, the upper part 14a of the base unit 14 may be provided with only one second rotor unit 16. FIG. 14 is a diagram illustrating an arrangement of two first rotor units 15 and one second rotor unit 16 according to a second modification. As illustrated in FIG. 14, the second rotor unit 16 includes wheels 11B and 11F.

The centers of rotation of the first rotary shaft member 151 of the two first rotor units 15 are disposed on a predetermined reference line while the carriage 10 is moving along a straight section. In this case, while the carriage 10 is moving along a curved section of the rail part 21, the middle point of the line segment connecting the center of rotation of the wheel 11B and the center of rotation of the wheel 11F is always located on the center line of the rail part 21. The line segment connecting the center of rotation of the wheel 11B and the center of rotation of the wheel 11F always intersects with the center line of the rail part 21 at the middle point of the line segment at a right angle. Therefore, the predetermined reference line in this modification coincides with the perpendicular bisector of the line segment connecting the center of rotation of the wheel 11B and the center of rotation of the wheel 11F. In this modification also, the center of rotation of the first rotary shaft member 151A of the first rotor unit 15A is disposed at a position on the predetermined reference line and offset from the line segment connecting the center of rotation of the wheel 11A and the center of rotation of the wheel 11E. The center of rotation of the first rotary shaft member 151B of the first rotor unit 15B is disposed at a position on the predetermined reference line and offset from the line segment connecting the center of rotation of the wheel 11D and the center of rotation of the wheel 11H.

The carriage 10 of the second modification has three rotor units including the first rotor unit 15A, the first rotor unit 15B, and the second rotor unit 16 that are attached to the upper part 14a of the base unit 14. Therefore, the carriage 10 of this modification has a load capacity higher than carriages with two rotor units that are attached to the upper part 14a of the base unit 14. This arrangement can also provide a carriage 10 having a high load capacity.

In the arrangement of this modification, the second rotor unit 16 is fixedly attached to the base unit 14. However, it is not necessary for the second rotor unit 16 to be fixedly attached to the base unit 14. The second rotor unit 16 may be attached to the base unit 14 in such a way as to be rotatable at the middle point of the line segment connecting the center of rotation of the wheel 11B and the center of rotation of the wheel 11F.

Second Embodiment

In the carriage according to the first embodiment, the two second rotor units 16 are fixedly attached to the upper part 14a of the base unit 14. In contrast, a carriage according to a second embodiment has two second rotor units 16 each having two wheels 11 that are rotatably attached to the upper part 14a of the base unit 14. In the following, only features that are different from the first embodiment will be described.

Figure 15:
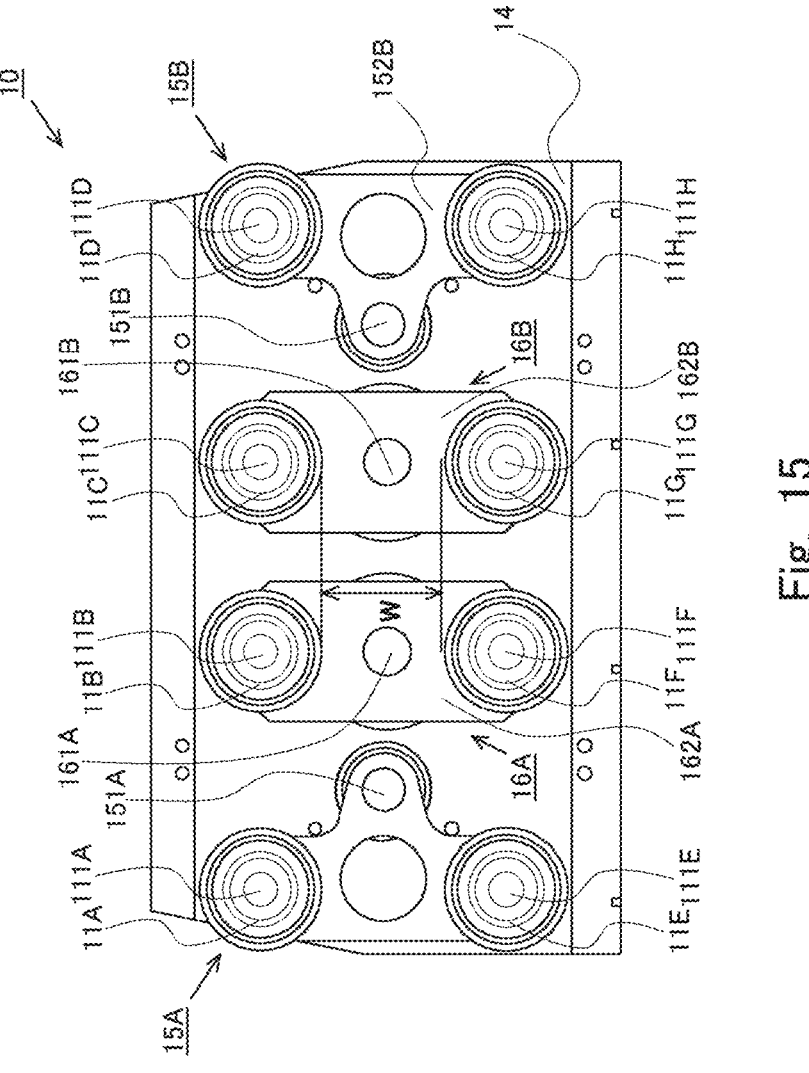
FIG. 15 is a diagram illustrating an arrangement of two first rotor units and two second rotor units according to a second embodiment.

FIG. 15 is a diagram illustrating an arrangement of two first rotor units 15 and two second rotor units 16 according to the second embodiment. As illustrated in FIG. 15, the upper part 14a of the base unit 14 is provided with the first rotor units 15A and 15B and the second rotor units 16A and 16B. The second rotor unit 16A has wheels 11B and 11F, which are attached to a second support member 162A via wheel rotary shaft members 111B and 111F. The second rotor unit 16B has wheels 11C and 11G, which are attached to a second support member 162B via wheel rotary shaft members 111C and 111G.

The second rotor unit 16A is provided with a second rotary shaft member 161A whose center of rotation is disposed at the middle point of the line segment connecting the center of rotation of the wheel 11B and the center of rotation of the wheel 11F. The second rotor unit 16B is provided with a second rotary shaft member 161B whose center of rotation is disposed at the middle point of the line segment connecting the center of rotation of the wheel 11C and the center of rotation of the wheel 11G. The second rotor unit 16A is connected to the base unit 14 in such a way as to be rotatable about the center of the second rotary shaft member 161A. The second rotor unit 16B is connected to the base unit 14 in such a way as to be rotatable about the center of the second rotary shaft member 161B. The wheels 11B, 11C, 11F, and 11G in the second rotor units 16A and 16B are arranged in such a way that the distance between the wheels 11B and 11F and the distance between the wheels 11C and 11G are the same distance W.

Figure 16:
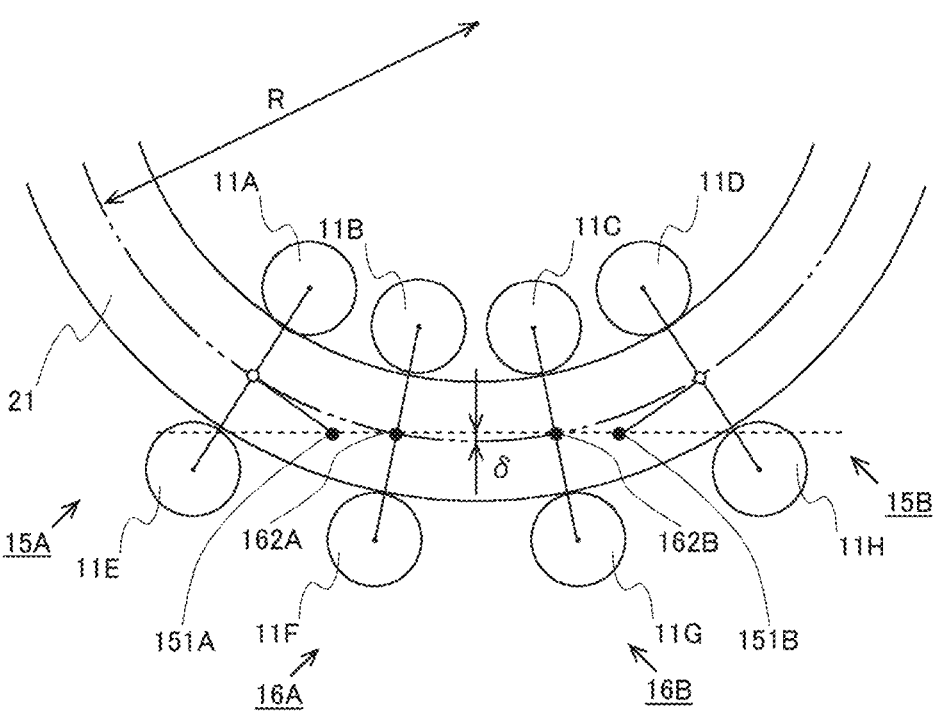
FIG. 16 is a diagram illustrating an arrangement of two first rotor units and two second rotor units while a carriage according to the second embodiment is moving along the curved section of the rail part.

FIG. 16 is a diagram schematically illustrating a state of the two first rotor units 15 and the two second rotor units 16 while the carriage 10 according to the embodiment is moving along a curved section of the rail part 21. The center of rotation of the first rotary shaft member 151A of the first rotor unit 15A is disposed at a position on a predetermined reference line and offset from the line segment connecting the center of rotation of the wheel A and the center of rotation of the wheel 11E. In this way, the wheels 11A and 11E of the first rotor unit 15A can maintain the state of abutting on the side surfaces of the rail part 21 in such a way as to sandwich the rail part 21 therebetween in both the curved and straight sections of the rail part 21. The center of rotation of the first rotary shaft member 151B of the first rotor unit 15B is disposed at a position on the predetermined reference line and offset from the line segment connecting the center of rotation of the wheel D and the center of rotation of the wheel 11H. In this way, the wheels 11D and 11H of the first rotor unit 15B can maintain the state of abutting on the side surfaces of the rail part 21 in such a way as to sandwich the rail part 21 therebetween in both the curved and straight sections of the rail part 21.

The center of rotation of the second rotary shaft member 161A and the center of rotation of the second rotary shaft member 161B are always located on the center line of the rail part 21 whether the carriage 10 is moving along a straight section or a curved section. Therefore, the predetermined reference line coincides with the line passing through the center of rotation of the second rotary shaft member 161A and the center of rotation of the second rotary shaft member 161B. Consequently, the wheels 11B and 11F of the second rotor unit 16A and the wheels 11C and 11G of the second rotor unit 16B can maintain the state of abutting on the side surfaces of the rail part 21 in such a way as to sandwich the rail part 21 therebetween.

As described above, the carriage 10 can be designed to have a structure including the first rotor unit 15A, the first rotor unit 15B, the second rotor unit 16A, and the second rotor unit 16B. This arrangement can also provide a carriage having a high load capacity.

First Modification

According to the second embodiment, the rotor units in the upper part 14a of the base unit 14 are arranged in such a way that the first rotor units 15A and 15B sandwich the second rotor units 16A and 16B along the rail part 21. However, it is not necessary for the rotor units in the upper part 14a of the base unit 14 to be arranged in such a way that the first rotor units 15A and 15B sandwich the second rotor units 16A and 16B along the rail part 21. The rotor units may be arranged in such a way that the second rotor units 16A and 16B sandwich the first rotor units 15A and 15B therebetween along the rail part 21.

Figure 17:
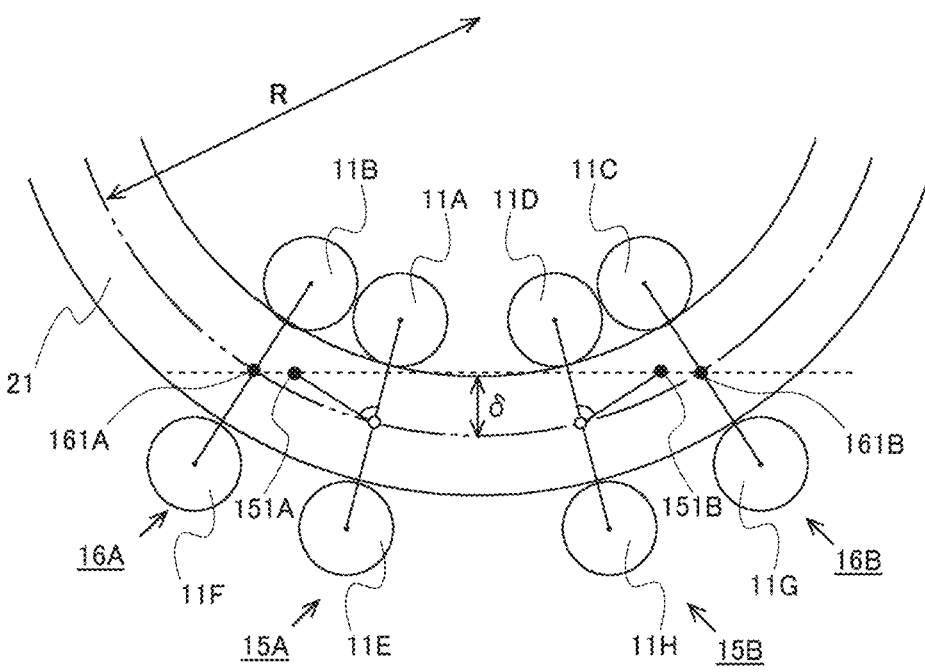
FIG. 17 is a diagram illustrating an arrangement of two first rotor units and two second rotor units according to a modification.

FIG. 17 is a diagram illustrating an arrangement of the two first rotor units 15 and the two second rotor units 16 according to a first modification of the second embodiment. As illustrated in FIG. 17, the rotor units are arranged in such a way that the second rotor units 16A and 16B sandwich the first rotor units 15A and 15B therebetween along the rail part 21. The center of rotation of the first rotary shaft member 151A of the first rotor unit 15A is located at a position on a predetermined reference line and offset from the line segment connecting the center of rotation of the wheel 11A and the center of rotation of the wheel 11E. The center of rotation of the first rotary shaft member 151B of the first rotor unit 15B is located at a position on the predetermined reference line and offset from the line segment connecting the center of rotation of the wheel 11D and the center of rotation of the wheel 11H. In this case also, the predetermined reference line in this modification coincides with the line passing through the center of rotation of the second rotary shaft member 161A and the center of rotation of the second rotary shaft member 161B.

It is not necessary for the center of rotation of the first rotary shaft member 151A of the first rotor unit 15A to be located on the perpendicular bisector of the line segment connecting the center of rotation of the wheel 11A and the center of rotation of the wheel 11E, so long as it is located on the predetermined reference line and at the middle point of the line segment connecting the center of rotation of the wheel 11A and the center of rotation of the wheel 11E. It is not necessary for the center of rotation of the first rotary shaft member 151B of the first rotor unit 15B to be located on the perpendicular bisector of the line segment connecting the center of rotation of the wheel 11D and the center of rotation of the wheel 11H, so long as it is located on the predetermined reference line and at the middle point of the line segment connecting the center of rotation of the wheel 11D and the center of rotation of the wheel 11H. This arrangement also can provide a carriage having a high load capacity.

Other Embodiments

The above embodiments are presented only by way of example, and modifications can be made to what is disclosed herein without departing from its essence. Processes and features disclosed herein can be adopted in any possible combination so long as it is technically feasible to do so.

REFERENCE SINGS LIST

1: conveyer system
10: carriage
11: wheel
111: wheel rotary shaft member
12: motor magnet
14: base unit 15: first rotor unit
151: first rotary shaft member
152: first support member
16: second rotor unit
161: second rotary shaft member
162: second support member
20: rail base part
21: rail part
22: motor coil
30: carriage
31: wheel
34: base unit
36: rotor unit
361: rotor's rotary shaft member

The invention claimed is:

1. A carriage moving along a rail part having a straight section and a curved section, comprising:

a base unit;

at least two first rotor units each including a pair of first wheels rotatably provided on the base unit in such a way as to sandwich the rail part therebetween, each of the first wheels abutting and rolling on a side surface of the rail part; and one or a pair of second rotor units each including a pair of second wheels rotatably provided on the base unit in such a way as to sandwich the rail part therebetween, each of the second wheels abutting and rolling on a side surface of the rail part;

wherein the pair of second wheels in each of the second rotor units is attached to the base unit via a second support member, and the pair of first wheels in each of the first rotor units is attached to the base unit via a first support member, the first support member being connected to the base unit in such a way as to be rotatable about a center of rotation located on a predetermined reference line of the base unit and offset from the line segment connecting the centers of rotation of the pair of first wheels, the predetermined reference line being a line that overlaps the center line of the straight section of the rail part when the carriage is moving along the straight section, wherein the carriage includes the pair of second rotor units, the second support members of the second rotor units are fixedly attached to the base unit, and when the radius of the center line of the curved section of the rail part is R, the width of the rail part is W, the diameter of the second wheel is D, the largest distance between the predetermined reference line and the center line of the rail part along the radial direction of the curved section of the rail part while the carriage is moving along the curved section of the rail part is δ, the distance between the centers of rotation of the two second wheels that are adjacent to each other along the rail part and located on the inner side of the curved section of the rail part when the carriage is moving along the curved section of the rail part is L1, and the distance between the centers of rotation of the two second wheels that are adjacent to each other along the rail part and located on the outer side of the curved section of the rail part when the carriage is moving along the curved section of the rail part is L2, the four second wheels of the pair of second rotor units are disposed in such a way that the distance between the predetermined reference line and the line segment connecting the centers of rotation of the two second wheels adjacent to each other along the rail part on the inner side of the rail part when the carriage is moving along the curved section of the rail part and the distance between the predetermined reference line and the line segment connecting the centers of rotation of the two second wheels adjacent to each other along the rail part on the outer side of the rail part when the carriage is moving along the curved section of the rail part are both equal to (W+D)/2 and that L1 and L2 satisfy the following equations:

$$L1 = 2\sqrt{\left(R - \frac{W+D}{2}\right)^2 - \left(R - \delta - \frac{W+D}{2}\right)^2}$$

$$L2 = 2\sqrt{\left(R + \frac{W+D}{2}\right)^2 - \left(R - \delta + \frac{W+D}{2}\right)^2}.$$

2. A carriage moving along a rail part having a straight section and a curved section, comprising:

a base unit;

at least two first rotor units each including a pair of first wheels rotatably provided on the base unit in such a way as to sandwich the rail part therebetween, each of the first wheels abutting and rolling on a side surface of the rail part; and one or a pair of second rotor units each including a pair of second wheels rotatably provided on the base unit in such a way as to sandwich the rail part therebetween, each of the second wheels abutting and rolling on a side surface of the rail part;

wherein the pair of second wheels in each of the second rotor units is attached to the base unit via a second support member, and the pair of first wheels in each of the first rotor units is attached to the base unit via a first support member, the first support member being connected to the base unit in such a way as to be rotatable about a center of rotation located on a predetermined reference line of the base unit and offset from the line segment connecting the centers of rotation of the pair of first wheels, the predetermined reference line being a line that overlaps the center line of the straight section of the rail part when the carriage is moving along the straight section, wherein the carriage includes the pair of second rotor units, the second support member in each of the pair of second rotor units is rotatably connected to the base unit at the middle point of the line segment connecting the centers of rotation of the pair of second wheels, and the center of rotation of the second support member in each of the pair of second rotor units is disposed on the predetermined reference line.

3. The carriage according to claim 1, wherein the carriage includes the pair of second rotor units, and the pair of second rotor units are arranged in such a way as to be sandwiched between the at least two first rotor units along the rail part.

4. The carriage according to claim 2, wherein the carriage includes the pair of second rotor units, and the pair of second rotor units are arranged in such a way as to be sandwiched between the at least two first rotor units along the rail part.

*   *   *   *   *